Figure 1:
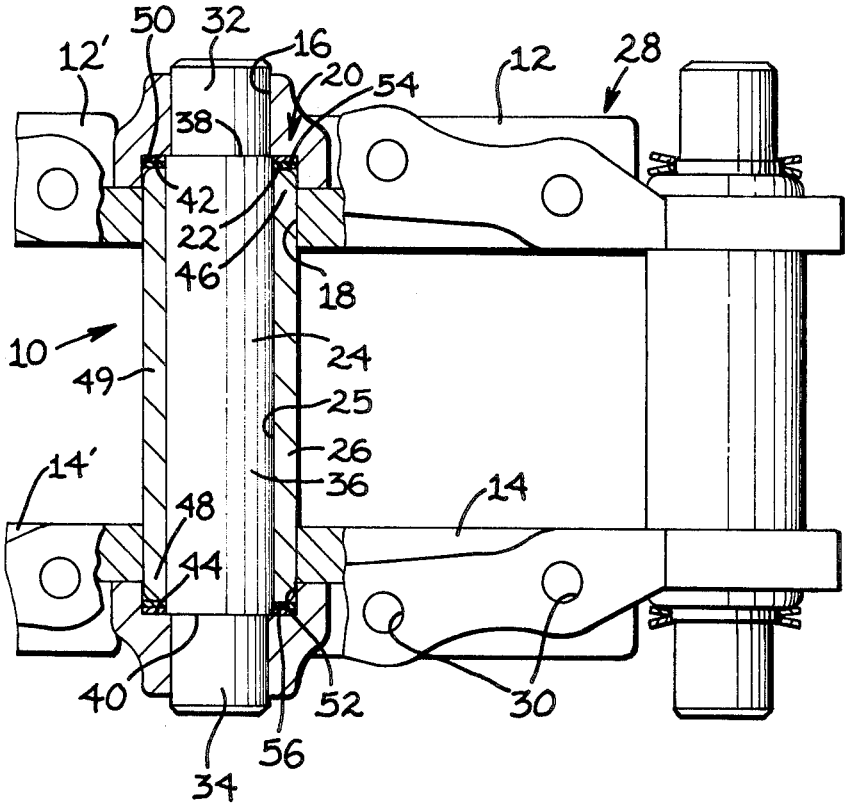
Figure 2:
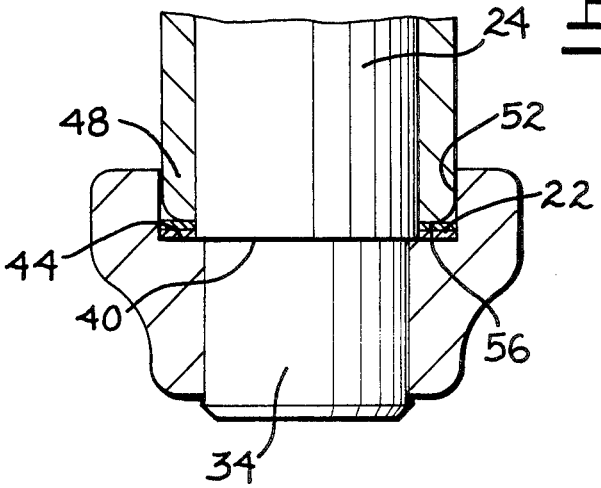

United States Defensive Publication [19] (H) [11] T980,007

Lammers [43] Mar. 6, 1979

[54] TRACK PIN WITH RETAINING STEPPED ENDS

[75] Inventor: Delmar R. Lammers, Dunlap, Ill.

[73] Assignee: Caterpillar Tractor Co., Peoria, Ill.

[21] Appl. No.: 925,501

[22] Filed: Jul. 17, 1978

[51] Int. Cl.[2] ..... B62D 55/20

[52] U.S. Cl. ..... 305/58 R

[57] ABSTRACT

Endless chains such as used for heavy-duty conveyors or crawler tractors often use spaced, coacting links with laterally overlying ends joined by hinge pins and bushings to couple segments carrying either load bearing plates or track shoes. Severe work environments often include fine particles of abrasive material which detrimentally affects the hinge joints. Therefore, suitable seals are provided to exclude such material. Without proper care, the joints deteriorate to the point where pins wear, loosen in link bores, and shift axially sufficiently to reduce the seal effectiveness. The sealed and lubricated chain hinge joints of the invention use pins with stepped ends to assure optimum positioning and functioning of the seals and to maintain against joint separation by inadvertent axial displacement of hinge pins.

1 Claim, 1 Sheet Drawing,

6 Pages Specification

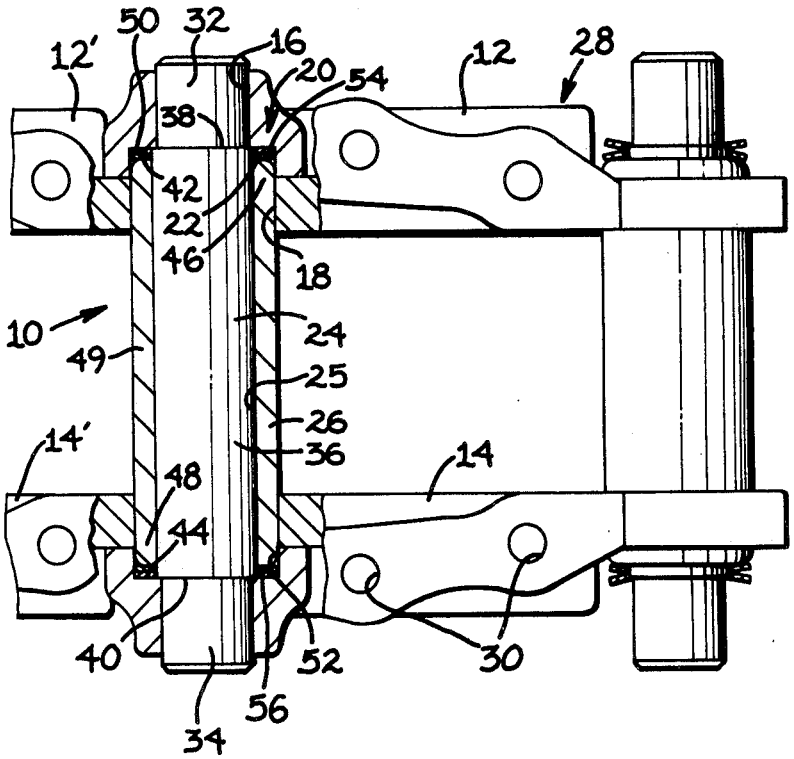

The file of this unexamined application may be inspected and copies thereof may be purchased (849 O.G. 1221, Apr. 9, 1968).